United States Patent
Shober (10) Patent No.: US 6,946,094 B2
(45) Date of Patent: Sep. 20, 2005

(54) ADJUSTABLE SIZING TUBE

(75) Inventor: Rodney L. Shober, Inman, KS (US)

(73) Assignee: American Maplan Corporation, McPherson, KS (US)

( * ) Notice: Subject to any disclaimer, the term of this patent is extended or adjusted under 35 U.S.C. 154(b) by 341 days.

(21) Appl. No.: 10/229,318

(22) Filed: Aug. 27, 2002

(65) Prior Publication Data

US 2004/0041300 A1 Mar. 4, 2004

(51) Int. Cl.$^7$ ............................................. B29C 47/20
(52) U.S. Cl. ................ 264/568; 264/209.4; 264/209.5; 425/192 R; 425/326.1; 425/388; 425/392; 425/191; 425/325
(58) Field of Search ............................ 425/190, 326.1, 425/192 R, 71, 388, 392, 191, 325; 264/209.4, 209.5, 568

(56) References Cited

U.S. PATENT DOCUMENTS 3,958,913 A * 5/1976 Stangl ........................ 425/445
4,543,051 A   9/1985 Maillefer ..................... 425/71
5,296,188 A   3/1994 Lupke ......................... 264/508
6,050,800 A   4/2000 Chapman et al. ............. 425/71

* cited by examiner

Primary Examiner—Joseph S. Del Sole
(74) Attorney, Agent, or Firm—Hamilton, Brook, Smith & Reynolds, P.C.

(57) ABSTRACT

There is provided a plastic extrusion sizing tube having a cylinder with a split along its length to allow for radial expansion and reduction of the sizing tube. The cylinder has holes to allow an extrusion within the cylinder to be drawn to the cylinder by a vacuum outside the cylinder. The cylinder also has extensions on opposite sides of the split with an adjustment screw connecting the extensions. The diameter of the cylinder can be expanded or reduced when the adjustment screw is turned in respective directions. A set screw can be connected to one of the extensions. The diameter of the cylinder can be expanded or reduced when the set screw is turned in respective directions. The diameter of the cylinder can be locked in a desired position when the adjustment screw and the set screw are turned in the same direction. The adjustment screw and the set screw can be located in a flange at one end of the cylinder. The holes in the cylinder can be slots.

18 Claims, 10 Drawing Sheets

ADJUSTABLE SIZING TUBE

BACKGROUND OF THE INVENTION

When extruding polyvinyl chloride (PVC) pipe, an adjustable sizing tube is used to guide, create and maintain the final outside dimensional configuration of the extruded pipe material before the pipe material has completely hardened. The sizing tube is located within a vacuum-calibration tank (VCT) which is located downstream from an extruder and respective extrusion die. The sizing tube can be either fixed or adjustable. However, the fixed sizing tube is made from a rigid-walled tube and cannot be adjusted. Both types of sizing tubes are characterized by circumferential slotted channel configurations.

Figure 1A:
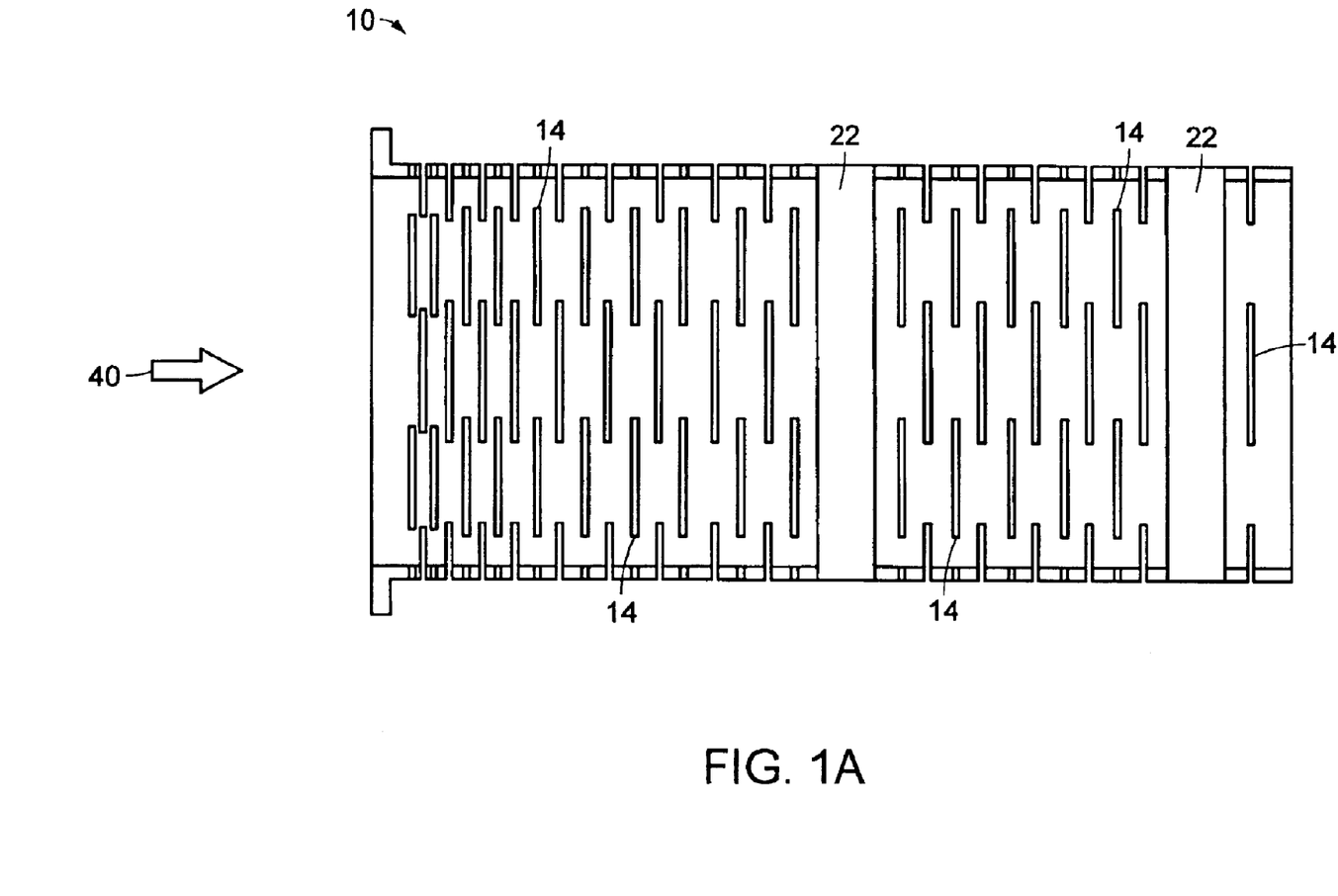
FIG. 1A is a side view of a prior art adjustable sizing tube.
Figure 1B:
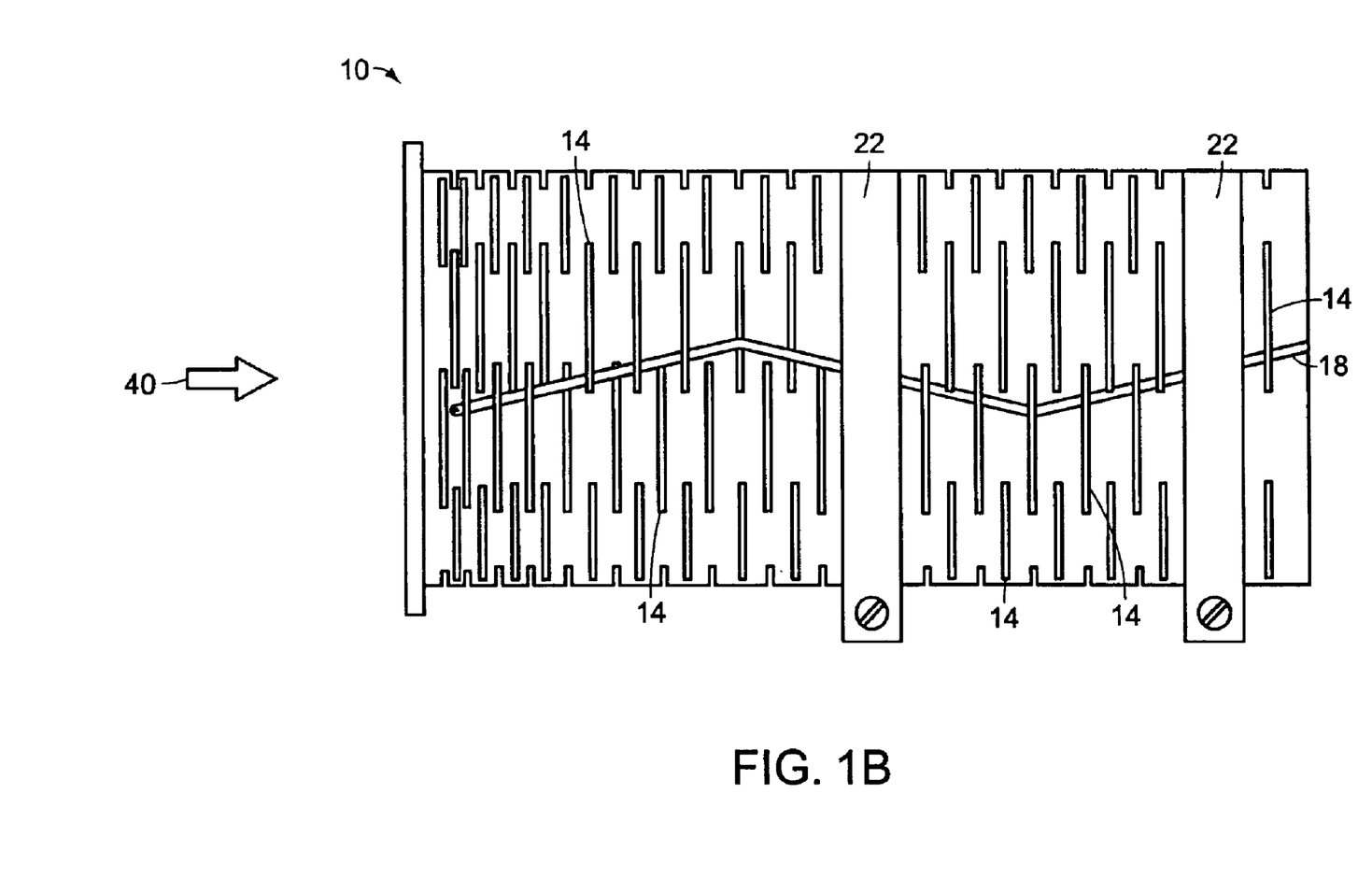
FIG. 1B is a side view of the prior art adjustable sizing tube of FIG. 1, showing a single slot configuration.

As shown in FIGS. 1A and 1B, a prior art adjustable sizing tube 10 has various slotted channel 14 configurations cut circumferentially throughout the length of the sizing tube 10. The slotted channels 14 allow a negative vacuum created in the VCT's chamber to "pull" the extruded pipe material against the inner wall of the sizing tube 10 to maintain the required outer diameter dimensional characteristics of the extruded pipe.

As shown in FIG. 1B, the prior art adjustable sizing tube 10 has a single slot 18 cut the entire length of the tube 10 which allows for minor reductions to the diameter of the sizing tube 10.

SUMMARY OF THE INVENTION

The prior art adjustable sizing tube 10 as shown in FIGS. 1A and 1B allow only for compression/reduction of the diameter of the sizing tube 10. To reduce the diameter of the pipe, strapping devices 22 are placed over the sizing tube 10 after it is installed in the vacuum-calibration tank (VCT). The strapping devices 22 are tightened or loosened, respectively, to achieve the desired extruded pipe diameter. Since the strapping devices 22 can only make the diameter of the sizing tube 10 smaller, the tolerances needed to machine the inner diameter of the tube 10 should error to a few thousandths of an inch in a larger diameter. The larger diameter is desirable because raw steel expresses an internal memory when machined. As layers of metal are removed from the sizing tube 10, the engineered-to-specification wall thickness may cause the adjustable sizing tube 10 to spring-in or spring-out by a few thousands of an inch. The worst condition is the spring-in effect because the diameter of the sizing tube 10 can only be reduced.

There is provided a plastic extrusion sizing tube having a cylinder with a split along its length to allow for radial expansion and reduction of the sizing tube. The cylinder has holes to allow an extrusion within the cylinder to be drawn to the cylinder by a vacuum outside the cylinder. The cylinder also has extensions on opposite sides of the split with an adjustment screw connecting the extensions. The diameter of the cylinder can be expanded or reduced when the adjustment screw is turned in respective directions.

A set screw can be connected to one of the extensions. The diameter of the cylinder can be expanded or reduced when the set screw is turned in respective directions. The diameter of the cylinder can be locked in a desired position when the adjustment screw and the set screw are turned in the same direction. The adjustment screw and the set screw can be located in a flange at one end of the cylinder. The holes in the cylinder can be slots.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 2:
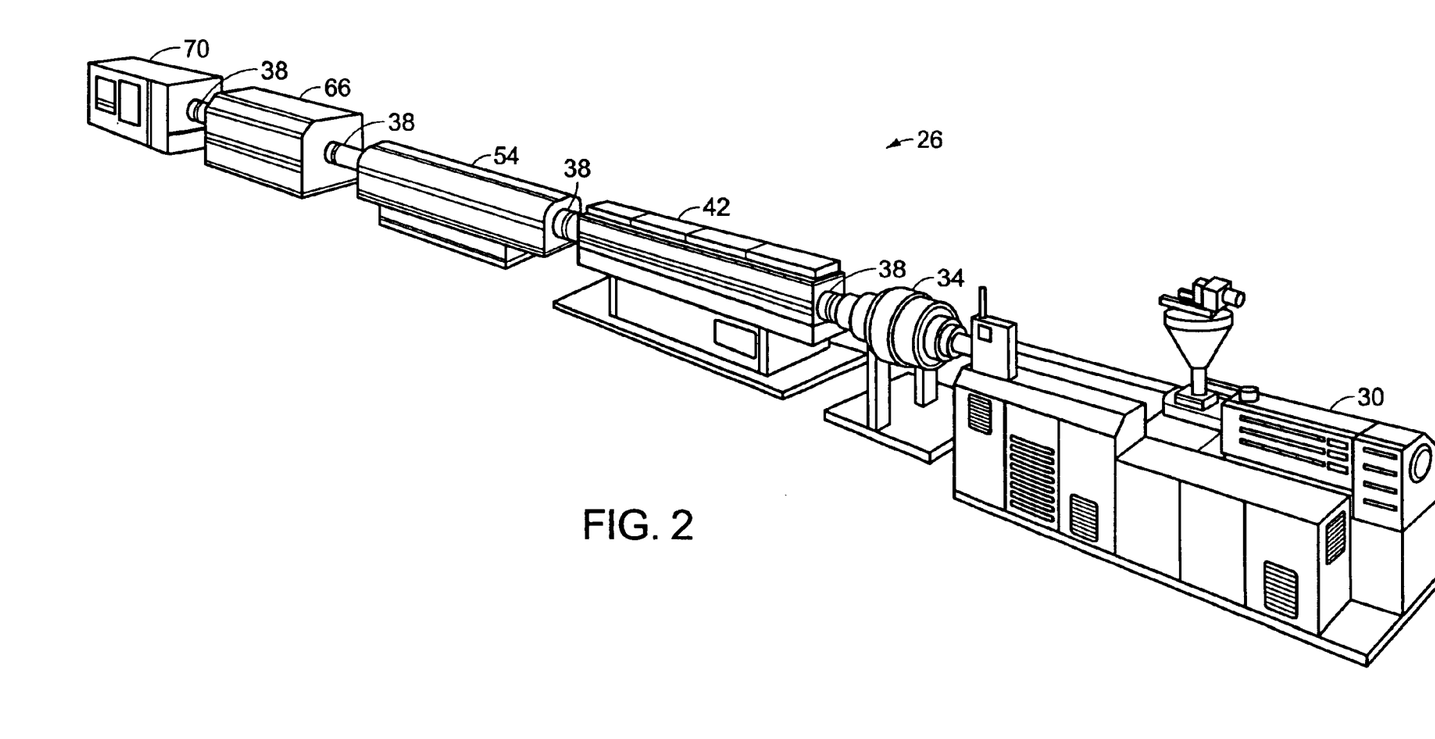
FIG. 2 is a view of an extrusion system.
Figure 3A:
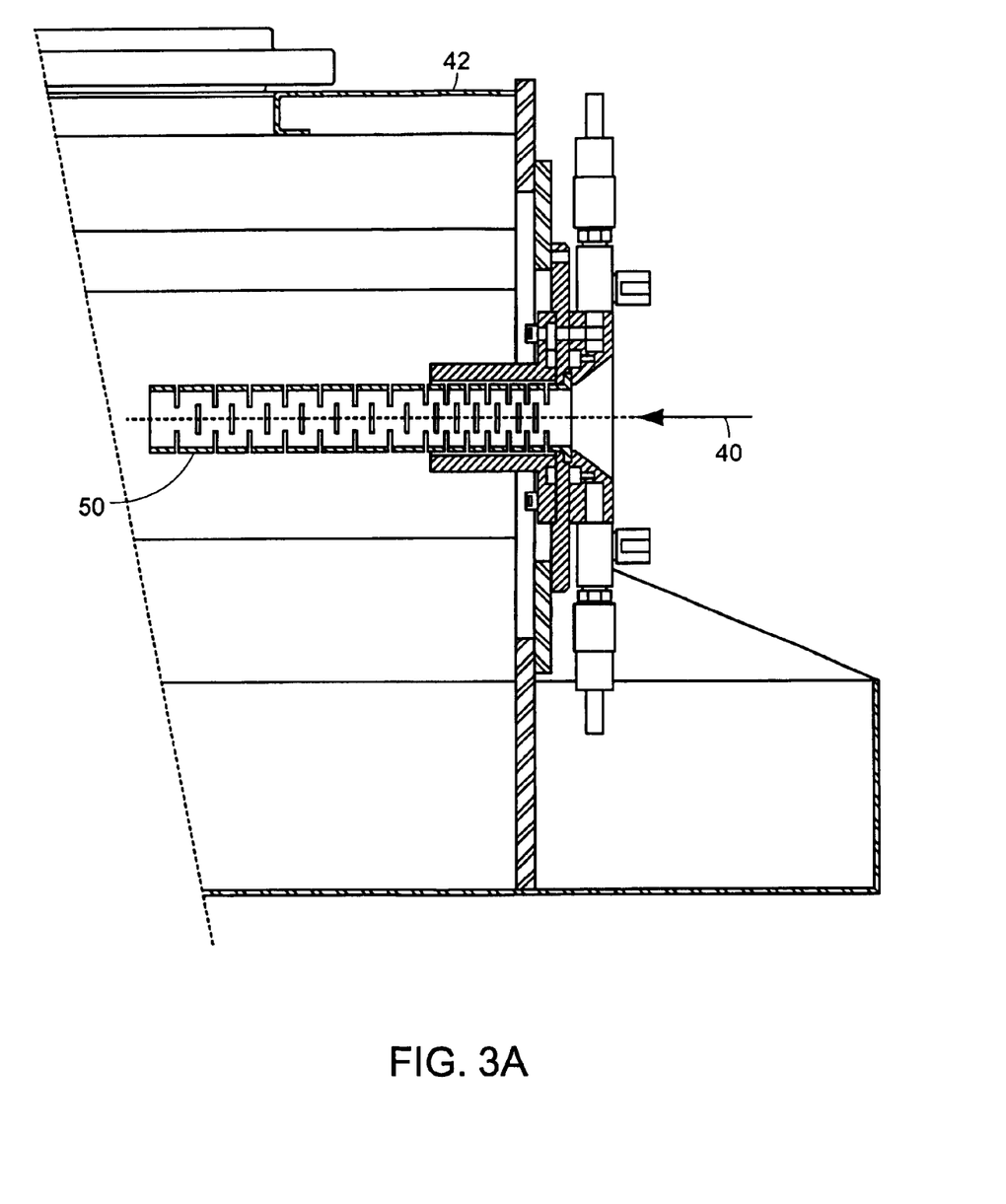
FIG. 3A is a cross-sectional view of the sizing tube located inside the vacuum calibration tank.
Figure 3B:
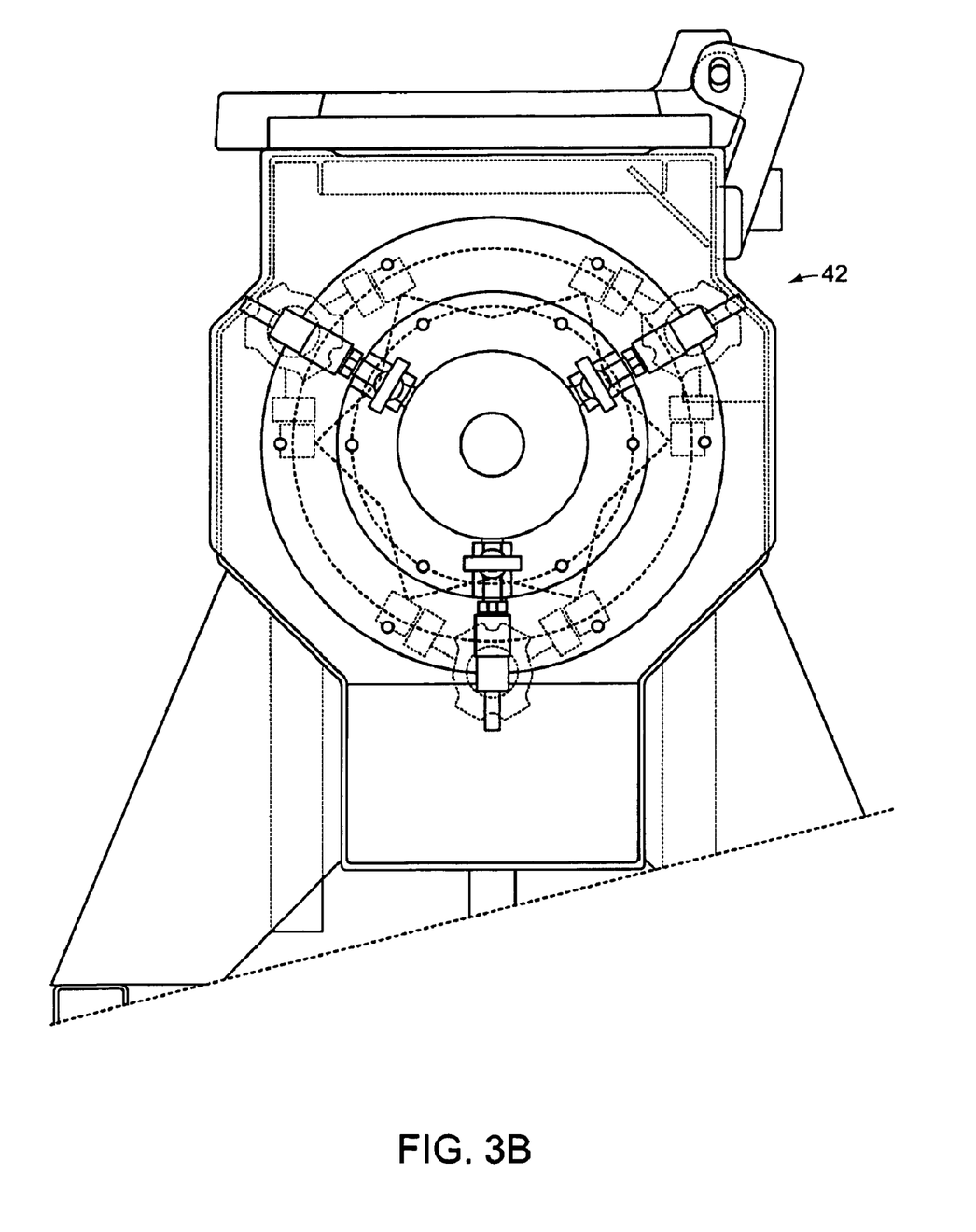
FIG. 3B is a view of the inlet of the vacuum calibration tank.
Figure 4A:
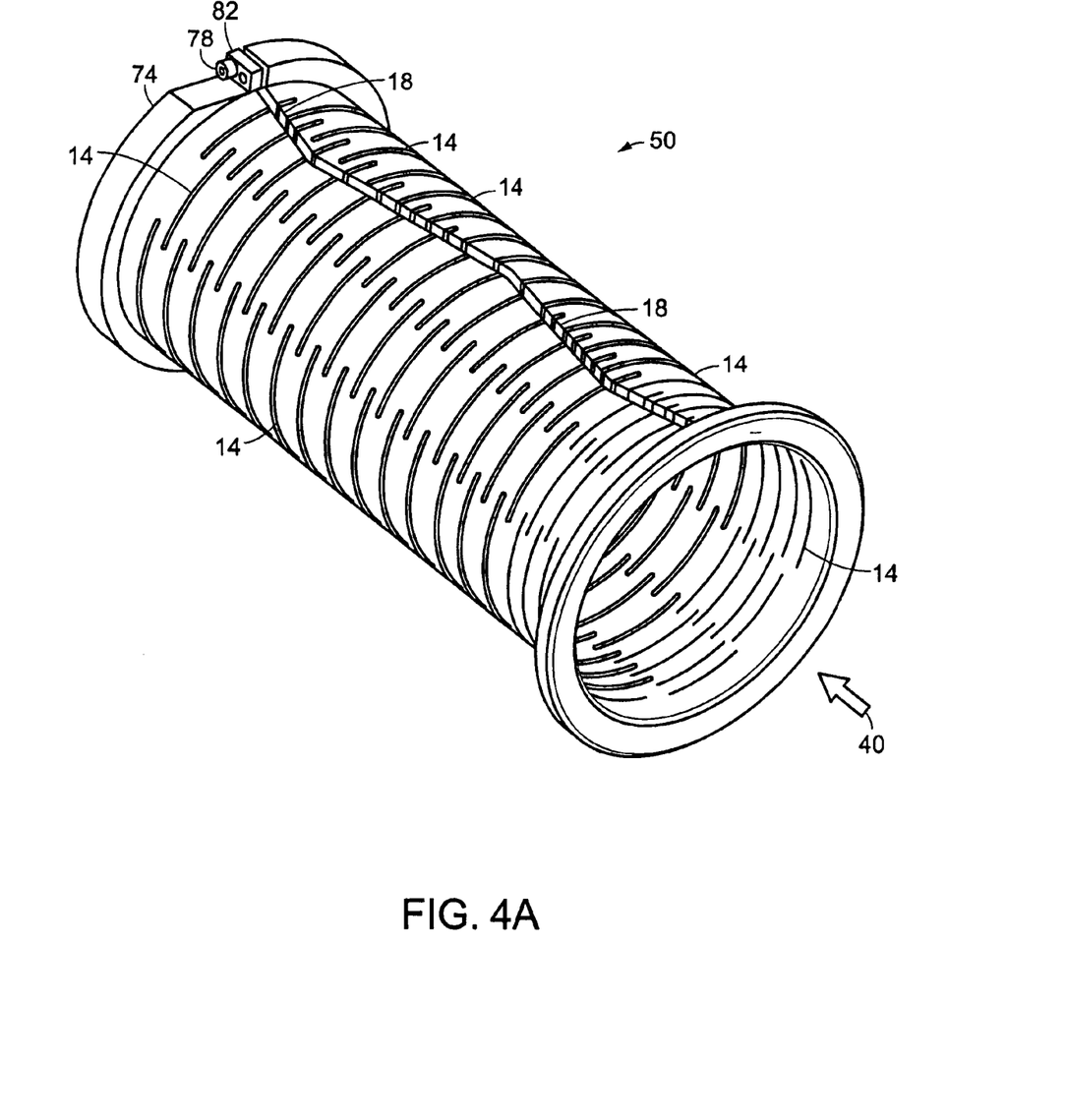
FIG. 4A is a perspective view of the adjustable sizing tube.
Figure 4B:
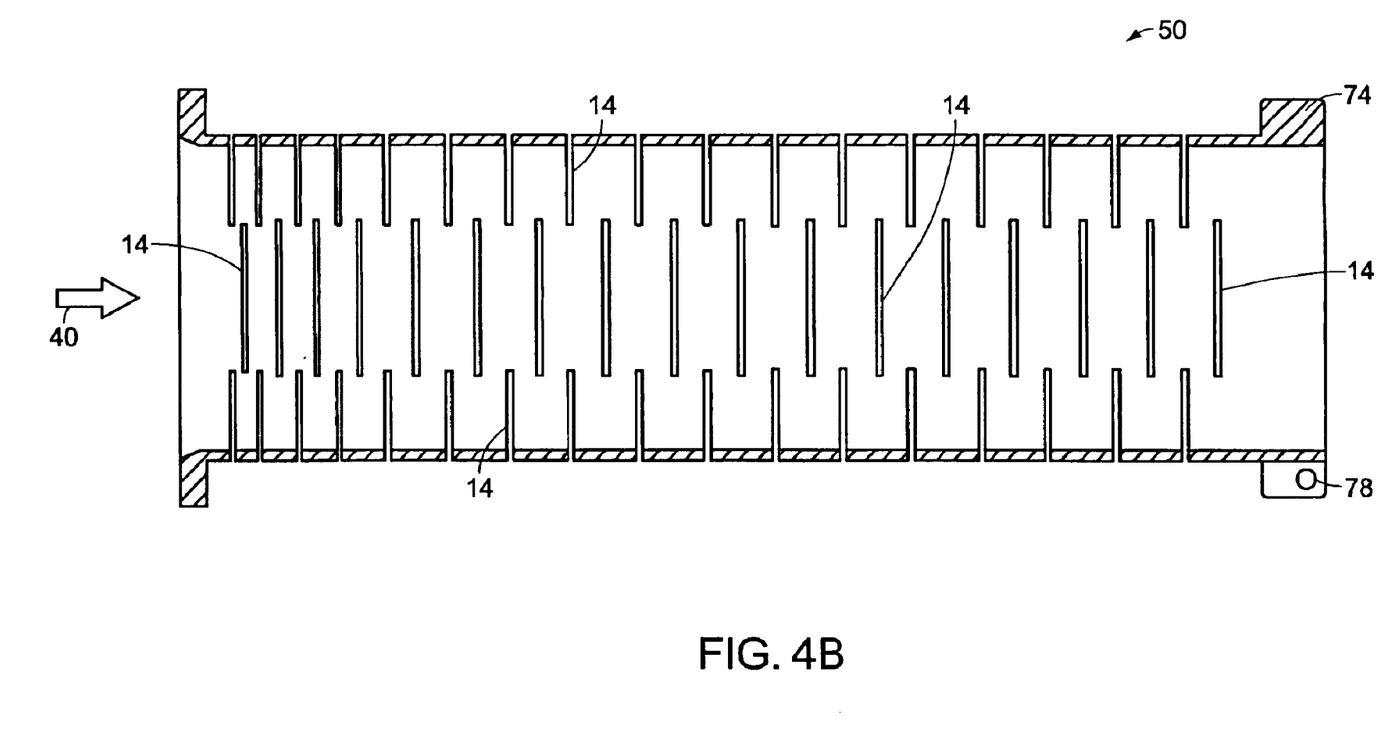
FIG. 4B is a cross-sectional view of the adjustable sizing tube of FIG. 4A.
Figure 4C:
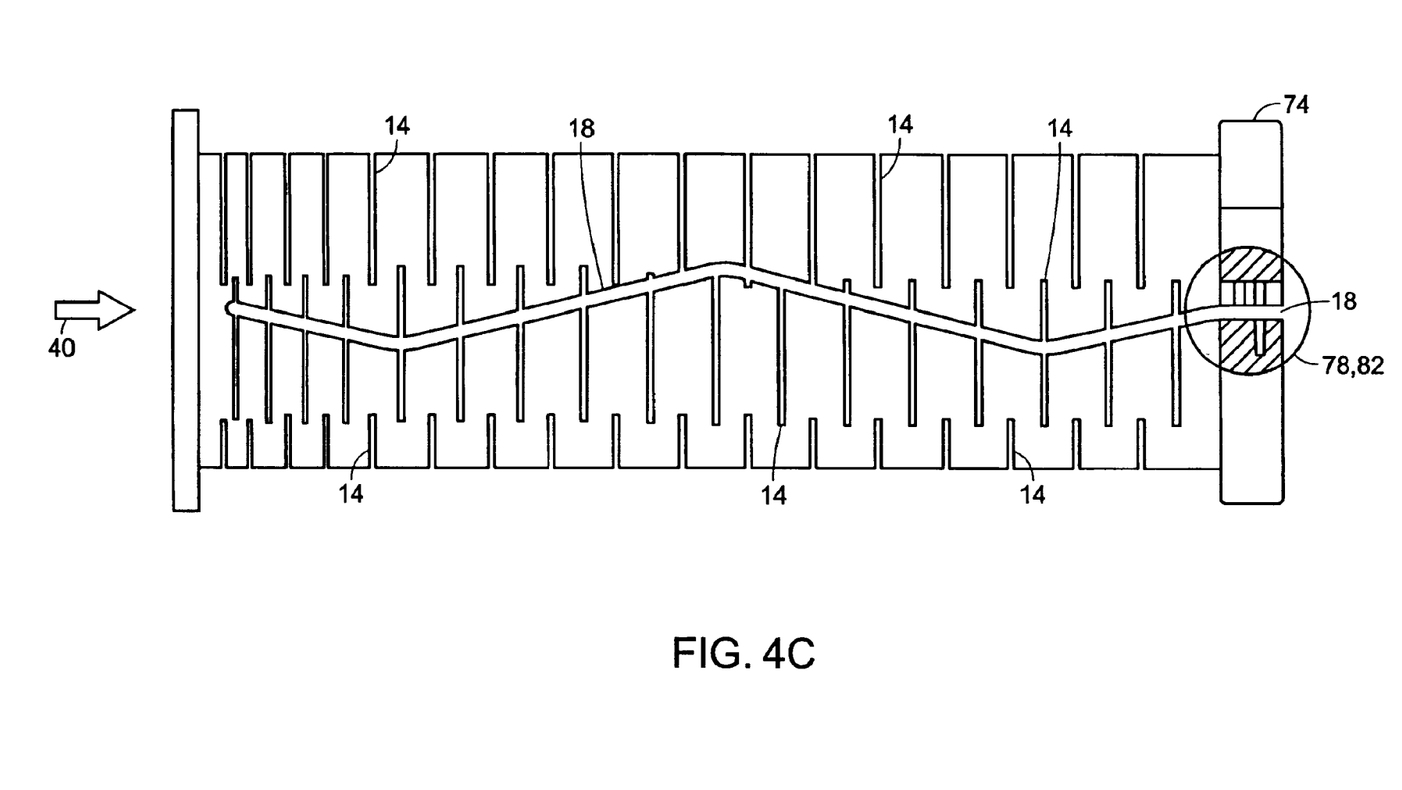
FIG. 4C is a cross-sectional view of the adjustable sizing tube of FIG. 4A, showing the slot configuration and adjustment flange.

In an extrusion system 26 as shown in FIGS. 2–3B, an extrusion such as extruded PVC pipe is formed by feeding plastic pellets into an extruder 30 where it is subjected to high temperatures to create a molten substrate. The substrate or melt proceeds through an extrusion head, at the end of which the melt passes through an extrusion die 34. The die 34 contains the circular cross-sectional profile shape to be extruded. The extruded pipe 38 exits the die 34 and flows in direction 40 into a vacuum calibration tank (VCT) 42. The VCT 42 cools the walls of the extruded pipe 38 to maintain a fixed shape while it passes through VCT 42. An adjustable sizing tube 50 is located within the VCT 42 to maintain the outer diameter of the extruded pipe 38. The VCT 42 draws a negative vacuum which maintains the walls of the extruded pipe 38 against the inside diameter of the sizing tube 50. The extruded pipe 38 proceeds from the VCT 42 to a spray tank 54 for further cooling of the extruded pipe 38. The now hardened pipe 38 proceeds through a pulling machine 66 which "pulls" the extruded pipe 38 from the die 34 through the system 26. The hardened pipe 38 exits the pulling machine 66 and enters a cutting machine 70 which automatically cuts the pipe 38 to a desired length.

As shown in FIGS. 4A–5D, the adjustable sizing tube 50 has slotted channels 14 cut circumferentially throughout the sizing tube 50. The adjustable sizing tube 50 has a single slot 18 cut the entire length of the tube 50 to allow for both reduction and expansion of the tube 50. An adjustment flange 74 (an example of extensions) located at the end of tube 50 allows for the reduction and expansion of the slot 18 to maintain a desired outer diameter of the extruded pipe 38.

The adjustment flange 74 contains at least two adjustment/set screws 78, 82 which allow for both a controlled reduction and expansion of the sizing tube's 50 diameter. While the extruded pipe 38 flows through the adjustable sizing tube 50 the adjustment screws 78, 82 are either tightened or loosened to reduce or expand the slot 18. Contraction of the slot 18 reduces the diameter of the sizing tube 50 and expansion of the slot 18 expands the diameter of the tube 50.

Figure 5A:
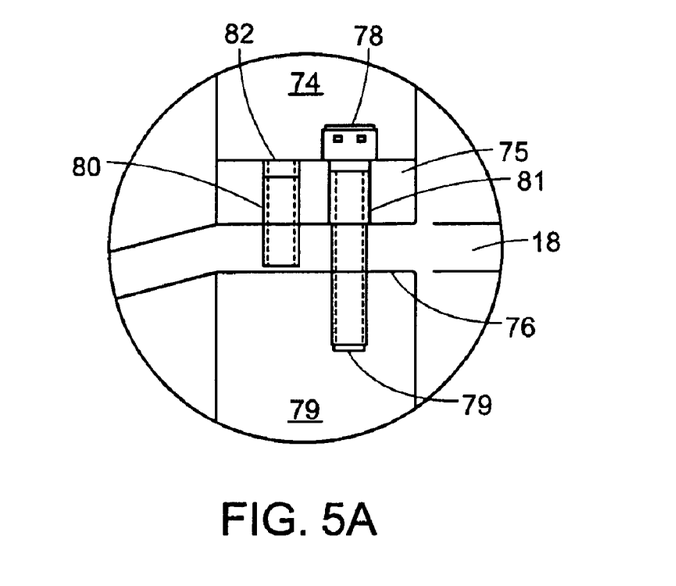
FIG. 5A is a cross-sectional view of the adjustment flange of FIG. 4.
Figure 5B:
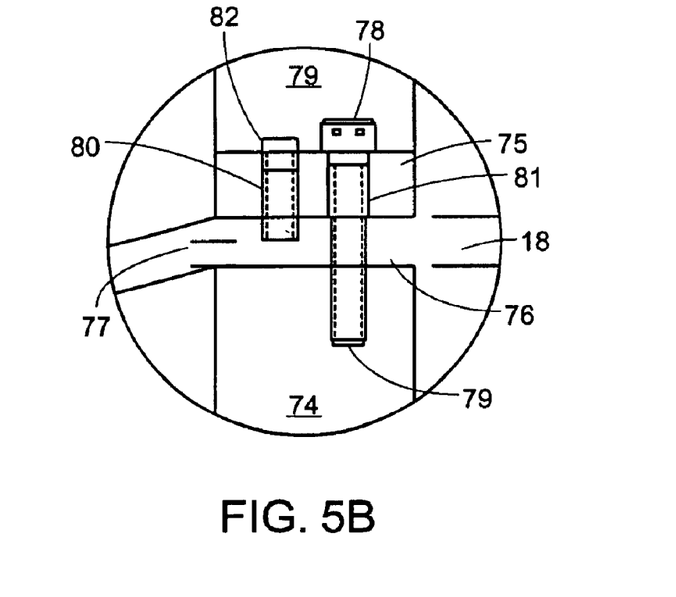
FIG. 5B is a cross-sectional view of the adjustment flange of FIG. 4, detailing adjustment of the set screw.
Figure 5C:
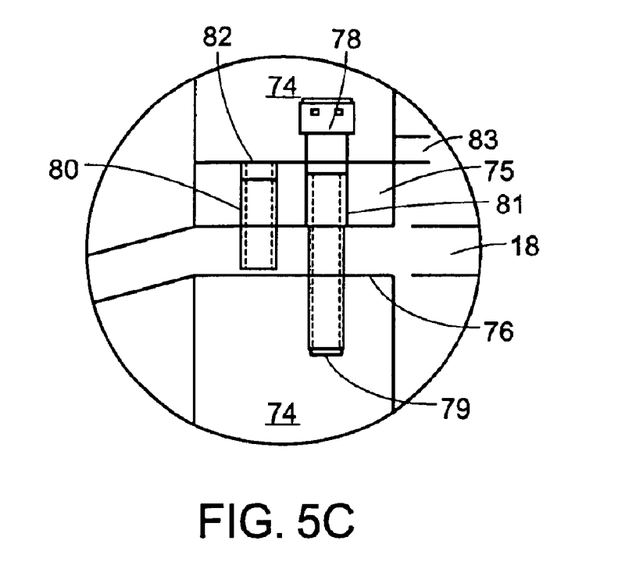
FIG. 5C is a cross-sectional view of the adjustment flange of FIG. 4, detailing adjustment of the adjustment screw.
Figure 5D:
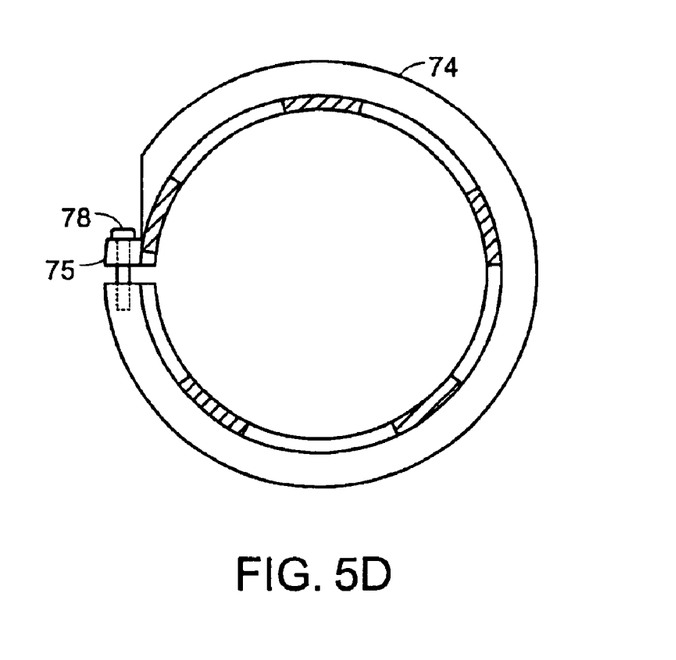
FIG. 5D is a view of the showing an opening of the adjustment flange of FIG. 4.

The flange 74 contains a lip 75 and seating surface 76 which are located on opposite sides of the split 18. The lip 75 contains two holes for accepting the adjustment screws 78, 82. Hole 80 is threaded for connecting adjustment screw 82. Hole 80 allows adjustment screw 78 to slide through and connect to threaded hole 79 in the seating surface 76.

To reduce the diameter of the sizing tube 50, adjustment screw 82 must be loosened to create a gap 77 (FIG. 5B) between the end of the screw and the seating surface 76. Adjustment screw 78 is then tightened until the desired diameter is achieved or the end of adjustment screw 82 reaches the seating surface 76. Further loosening of adjustment screw 82 may be required to obtain the desired diameter. Once the desired diameter is achieved, adjustment screw 82 is tightened until it reaches the seating surface 76 thereby "locking" the diameter in place.

To expand the diameter of the sizing tube 50, adjustment screw 78 must be loosened to create a gap 83 (FIG. 5C) between the head of the screw and the lip 75. Adjustment screw 82 is then tightened until the desired diameter is achieved or the head of adjustment screw 78 reaches the lip 75. Further loosening of adjustment screw 78 may be required to obtain the desired diameter. Once the desired diameter is achieved, adjustment screw 78 is tightened until it reaches the lip 75 thereby "locking" the diameter in place.

The adjustment screws 78, 82 allow for adjustments measurable by a few thousands of an inch. The "locking" prevents the diameter of the sizing tube 50 from wandering. It should be understood that any type of device capable of expanding or reducing the diameter of the sizing tube 50 can be used. One device may be a single screw that can expand and reduce the diameter of the sizing tube 50 and a set screw used to prevent the diameter from wandering. The process can also be automated by using a hydraulic piston or other type device.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of sizing a diameter of an extrusion comprising the steps of:
   shaping an extrusion using an extrusion die;
   cooling the extrusion and adjusting the diameter of the extrusion received from the extrusion die in a vacuum box;
   adjusting a sizing tube located within the vacuum box having a split along its length to allow for radial expansion and reduction and having holes to allow the extrusion within the sizing tube to be drawn to the sizing tube by the vacuum box;
   adjusting a first adjustment screw connecting extensions on opposite sides of the split, adjustment of the first adjustment screw in respective directions allowing for expansion and reduction of the sizing tube.

2. The method of claim 1, further comprising the step of:
   connecting a second adjustment screw to one of the extensions, adjustment of the second adjustment screw in respective directions allowing for expansion and reduction of the cylinder.

3. The method of claim 2, wherein adjustment of the first adjustment screw and the second adjustment screw in the same direction locks the diameter of the cylinder.

4. The method of claim 2, wherein the first adjustment screw and the second adjustment screw are located in one extension at one end of the cylinder.

5. The method of claim 1, wherein the holes are slots.

6. The method of claim 1, wherein the extensions form a flange.

7. A plastic extrusion sizing tube comprising:
   a cylinder having a split along its length to allow for radial expansion and reduction and having holes to allow an extrusion within the cylinder to be drawn to the cylinder by a vacuum outside the cylinder;
   extensions from the cylinder on opposite sides of the split; and
   a first adjustment screw connecting the extensions, adjustment of the first adjustment screw in respective directions allowing for expansion and reduction of the cylinder.

8. The sizing tube of claim 7, further comprising:
   a second adjustment screw repelling the extensions, adjustment of the second adjustment screw in respective directions allowing for expansion and reduction of the cylinder.

9. The sizing tube of claim 8, wherein adjustment of the first adjustment screw and the second adjustment screw in the same direction locks the diameter of the cylinder.

10. The sizing tube of claim 8, wherein the first adjustment screw and the second adjustment screw are located in one extension at one end of the cylinder.

11. The sizing tube of claim 7, wherein the holes are slots.

12. The sizing tube of claim 7, wherein the extensions form a flange.

13. An extrusion system comprising:
   an extrusion die for shaping an extrusion;
   a vacuum box for cooling the extrusion and adjusting the diameter of the extrusion received from the extrusion die;
   a sizing tube located within the vacuum box having a split along its length to allow for radial expansion and reduction and having holes to allow the extrusion within the sizing tube to be drawn to the sizing tube by the vacuum box;
   extensions from the sizing tube on opposite sides of the split; and
   a first adjustment screw connecting the extensions, adjustment of the first adjustment screw in respective directions allowing for expansion and reduction of the sizing tube.

14. The extrusion system of claim 13, further comprising:
   a second adjustment screw repelling the extensions, adjustment of the second adjustment screw in respective directions allowing for expansion and reduction of the cylinder.

15. The extrusion system of claim 14, wherein adjustment of the first adjustment screw and the second adjustment screw in the same direction locks the diameter of the cylinder.

16. The extrusion system of claim 14, wherein the first adjustment screw and the second adjustment screw are located in one extension at one end of the cylinder.

17. The extrusion system of claim 13, wherein the holes are slots.

18. The extrusion system of claim 13, wherein the extensions form a flange.

* * * * *